US012798570B2

(12) United States Patent
Shimizu et al.

(10) Patent No.: US 12,798,570 B2
(45) Date of Patent: Nov. 17, 2026

(54) VEHICLE CONTROL DEVICE, VEHICLE CONTROL METHOD, AND STORAGE MEDIUM

(71) Applicant: HONDA MOTOR CO., LTD., Tokyo (JP)

(72) Inventors: Takahiro Shimizu, Tokyo (JP); Sho Tamura, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 1 day.

(21) Appl. No.: 19/059,336

(22) Filed: Feb. 21, 2025

(65) Prior Publication Data

US 2025/0276686 A1 Sep. 4, 2025

(30) Foreign Application Priority Data

Mar. 4, 2024 (JP) ................................ 2024-032136

(51) Int. Cl.

*B60W 30/10* (2006.01)
*B60W 50/00* (2006.01)
*G01C 21/30* (2006.01)

(52) U.S. Cl.

CPC ........ *B60W 30/10* (2013.01); *B60W 50/0097* (2013.01); *G01C 21/30* (2013.01); *B60W 2552/53* (2020.02); *B60W 2556/40* (2020.02)

(58) Field of Classification Search

CPC ............. B60W 30/10; B60W 50/0097; B60W 2552/53; B60W 2556/40; B60W 2552/00;

(Continued)

(56) References Cited

U.S. PATENT DOCUMENTS 10,248,124 B2 * 4/2019 Bellaiche ............. G06V 20/588
11,003,945 B2 * 5/2021 Adams ...................... G06T 7/73

(Continued)

FOREIGN PATENT DOCUMENTS

JP 2019-132762 8/2019
JP 2022-185787 12/2022
JP 7433382 2/2024

OTHER PUBLICATIONS

Benedict Flade et al., Lane Detection Based Camera to Map Alignment Using Open-Source Map Data, 2018, Honda Research Institute Europe GmbH, pp. 1-9 (pdf).*

(Continued)

*Primary Examiner* — Manglesh M Patel

(74) *Attorney, Agent, or Firm* — Amin, Turocy & Watson, LLP

(57) ABSTRACT

A vehicle control device recognizes a road marking located in a travel direction of a vehicle, determines whether or not the recognized road marking matches a map road marking based on map information and determines whether or not a one-sided road marking that has been recognized matches a one-sided map road marking when the road marking has been recognized only for one side, corrects the one-sided map road marking on the basis of the recognized one-sided road marking, and performs travel control for the vehicle. The vehicle control device calculates a first self-position of the vehicle, calculates a second self-position of the vehicle, and performs the travel control for the vehicle so that the vehicle travels to a position based on the map road marking before the correction when an error between the first self-position and the second self-position is greater than or equal to a first threshold value.

8 Claims, 7 Drawing Sheets

(58) Field of Classification Search
CPC .. B60W 2552/05; B60W 30/12; B60W 30/16; B60W 30/162; B60W 30/165; B60W 30/17; B60W 30/182; B60W 50/082; G01C 21/30; G05D 1/0061; G05D 1/0088; G05D 1/021; G05D 1/0214; G05D 1/0221; G05D 1/0223; B60K 28/00–165
See application file for complete search history.

(56) References Cited

U.S. PATENT DOCUMENTS

| | | | | |
|---|---|---|---|---|
| 11,772,680 | B2 * | 10/2023 | Shapira | B60W 60/001 701/28 |
| 11,852,498 | B2 * | 12/2023 | Wang | G01C 21/32 |
| 12,098,925 | B2 * | 9/2024 | Kim | G01C 21/30 |
| 2016/0132705 | A1 * | 5/2016 | Kovarik | E01F 9/30 340/10.3 |
| 2017/0010618 | A1 * | 1/2017 | Shashua | G01C 21/30 |
| 2020/0271473 | A1 * | 8/2020 | Wang | G08G 1/133 |
| 2021/0172756 | A1 * | 6/2021 | Wheeler | G01C 21/3638 |
| 2022/0001872 | A1 * | 1/2022 | Taieb | G06V 10/44 |
| 2023/0408264 | A1 * | 12/2023 | Wang | G01C 21/30 |
| 2024/0051528 | A1 | 2/2024 | Tamura | |
| 2024/0142261 | A1 * | 5/2024 | Ogata | G01C 21/3885 |
| 2026/0092787 | A1 * | 4/2026 | Liu | G01C 21/30 |

OTHER PUBLICATIONS

Japanese Notice of Allowance for Japanese Patent Application No. 2024-032136 mailed Oct. 28, 2025.

* cited by examiner

FIG. 3

| DRIVING MODE | CONTROL STATE | TASK |
|---|---|---|
| MODE A | AUTOMATED DRIVING | FORWARD MONITORING: UNNECESSARY<br>STEERING GRIP: UNNECESSARY |
| MODE B | DRIVING ASSISTANCE | FORWARD MONITORING: NECESSARY<br>STEERING GRIP: UNNECESSARY |
| MODE C | DRIVING ASSISTANCE | FORWARD MONITORING: NECESSARY<br>STEERING GRIP: NECESSARY |
| MODE D | DRIVING ASSISTANCE | FORWARD MONITORING: NECESSARY<br>AT LEAST CERTAIN DEGREE OF DRIVING OPERATION IS NECESSARY |
| MODE E | MANUAL DRIVING | FORWARD MONITORING: NECESSARY<br>DRIVING OPERATION IS NECESSARY FOR BOTH STEERING AND ACCELERATION/DECELERATION |

TASK: LIGHT

TASK: HEAVY

VEHICLE CONTROL DEVICE, VEHICLE CONTROL METHOD, AND STORAGE MEDIUM

CROSS-REFERENCE TO RELATED APPLICATION

Priority is claimed on Japanese Patent Application No. 2024-032136, filed Mar. 4, 2024, the content of which is incorporated herein by reference.

BACKGROUND

Field of the Invention

The present invention relates to a vehicle control device, a vehicle control method, and a storage medium.

Description of Related Art

In recent years, efforts to provide access to sustainable transportation systems have been increasingly active in consideration of vulnerable individuals among participants in transportation. For this realization, research and development efforts are focused on further improving the safety and convenience of transportation through research and development related to automated driving technology.

Meanwhile, in automated driving technology, a match between a road marking recognized from a camera image and a road marking recognized from map information is confirmed, a target trajectory for a host vehicle is generated on the basis of a matched road marking for both sides or one side and automated driving or driving assistance is executed along the generated target trajectory. For example, Japanese Unexamined Patent Application, First Publication No. 2022-185787 discloses that automated driving of a host vehicle will continue when there is a road marking recognized from a camera image only for one side and the road marking matches the map information.

However, in the prior art, even if there is an error in the road marking recognized only for one side and the road marking mismatches the map information, the host vehicle continues automated driving on the basis of the mismatched road marking or map information. As a result, a lateral error occurs in a self-position of the vehicle specified on the basis of the mismatched road marking or map information, and, for example, the vehicle is swayed in the lateral direction, the stability of the automated driving may be impaired.

SUMMARY

The present invention has been made in consideration of such circumstances and an objective of the present invention is to provide a vehicle control device, a vehicle control method, and a storage medium for enabling the stability of automated driving to be ensured even if there is an error in recognition of a road marking only for one side and there is a mismatch with map information. By extension, it also contributes to the development of a sustainable transportation system.

A vehicle control device, a vehicle control method, and a storage medium according to the present invention adopt the following configurations.

(1): According to an aspect of the present invention, there is provided a vehicle control device including: a storage medium storing computer-readable instructions; and a processor connected to the storage medium, the processor executing the computer-readable instructions to: recognize a road marking located in a travel direction of a vehicle, determine whether or not the recognized road marking matches a map road marking based on map information stored in a storage unit and determine whether or not a one-sided road marking that has been recognized matches a one-sided map road marking when the road marking has been recognized only for one side, correct the one-sided map road marking on the basis of the recognized one-sided road marking when it is determined that the recognized one-sided road marking matches the one-sided map road marking, and perform travel control for the vehicle, wherein the processor calculates a first self-position of the vehicle based on the one-sided map road marking before the correction on the basis of a travel state of the vehicle, calculates a second self-position of the vehicle based on the one-sided map road marking after the correction or the recognized one-sided road marking, and performs the travel control for the vehicle so that the vehicle travels to a position based on the map road marking before the correction or a position based on the one-sided map road marking after re-correction offset from the recognized one-sided road marking to the map road marking before the correction when an error between the first self-position and the second self-position is greater than or equal to a first threshold value.

(2): In the above-described aspect (1), the position based on the map road marking before the correction is a position located between two or more map road markings.

(3): In the above-described aspect (1), the position based on the map road marking before the correction is a future position predicted from the travel state when the vehicle has traveled on the basis of the map road marking before the correction.

(4): In the above-described aspect (1), the position based on the map road marking before the correction is a position obtained by correcting a position located between two or more map road markings according to a future position predicted from the travel state in which the vehicle has traveled on the basis of the map road marking before the correction.

(5): In the above-described aspect (1), the processor performs the travel control for the vehicle so that the vehicle travels to the position based on the map road marking before the correction when errors between the first self-position and the second self-position obtained in a plurality of calculation processes are greater than or equal to the first threshold value and any one of the errors obtained in the plurality of calculation processes is greater than or equal to a second threshold value.

(6): In the above-described aspect (1), the processor stops the travel control for the vehicle when a state in which the travel control for the vehicle is performed has continued during a predetermined period so that the vehicle travels to a position based on the map road marking before the correction.

(7): According to another aspect of the present invention, there is provided a vehicle control method including: recognizing, by a computer mounted on a vehicle, a road marking located in a travel direction of the vehicle; determining, by the computer, whether or not the recognized road marking matches a map road marking based on map information stored in a storage unit and determining whether or not a one-sided road marking that has been recognized matches a one-sided map road marking when the road marking has been recognized only for one side; correcting, by the computer, the one-sided map road marking on the basis of the recognized one-sided road marking when it is determined that the recognized one-sided road marking matches the one-sided map road marking; performing, by the computer, travel control for the vehicle; and calculating, by the computer, a first self-position of the vehicle based on the one-sided map road marking before the correction on the basis of a travel state of the vehicle, calculating a second self-position of the vehicle based on the one-sided map road marking after the correction or the recognized one-sided road marking, and performing the travel control for the vehicle so that the vehicle travels to a position based on the map road marking before the correction or a position based on the one-sided map road marking after re-correction offset from the recognized one-sided road marking to the map road marking before the correction when an error between the first self-position and the second self-position is greater than or equal to a first threshold value.

(8): According to yet another aspect of the present invention, there is provided a computer-readable non-transitory storage medium storing a program for causing a computer mounted on a vehicle to: recognize a road marking located in a travel direction of the vehicle; determine whether or not the recognized road marking matches a map road marking based on map information stored in a storage unit and determine whether or not a one-sided road marking that has been recognized matches a one-sided map road marking when the road marking has been recognized only for one side; correct the one-sided map road marking on the basis of the recognized one-sided road marking when it is determined that the recognized one-sided road marking matches the one-sided map road marking; perform travel control for the vehicle; and calculate a first self-position of the vehicle based on the one-sided map road marking before the correction on the basis of a travel state of the vehicle, calculate a second self-position of the vehicle based on the one-sided map road marking after the correction or the recognized one-sided road marking, and perform the travel control for the vehicle so that the vehicle travels to a position based on the map road marking before the correction or a position based on the one-sided map road marking after re-correction offset from the recognized one-sided road marking to the map road marking before the correction when an error between the first self-position and the second self-position is greater than or equal to a first threshold value.

According to the above-described aspects (1) to (8), it is possible to ensure the stability of automated driving even if there is an error in recognition of a road marking only for one side and there is a mismatch with map information.

BRIEF DESCRIPTION OF THE DRAWINGS

FIG. 3 is a diagram showing an example of a corresponding relationship of a driving mode and a control state of a host vehicle and a task.

DESCRIPTION OF EMBODIMENTS

Hereinafter, embodiments of a vehicle control device, a vehicle control method, and a storage medium of the present invention will be described with reference to the drawings.

[Overall Configuration]

Figure 1:
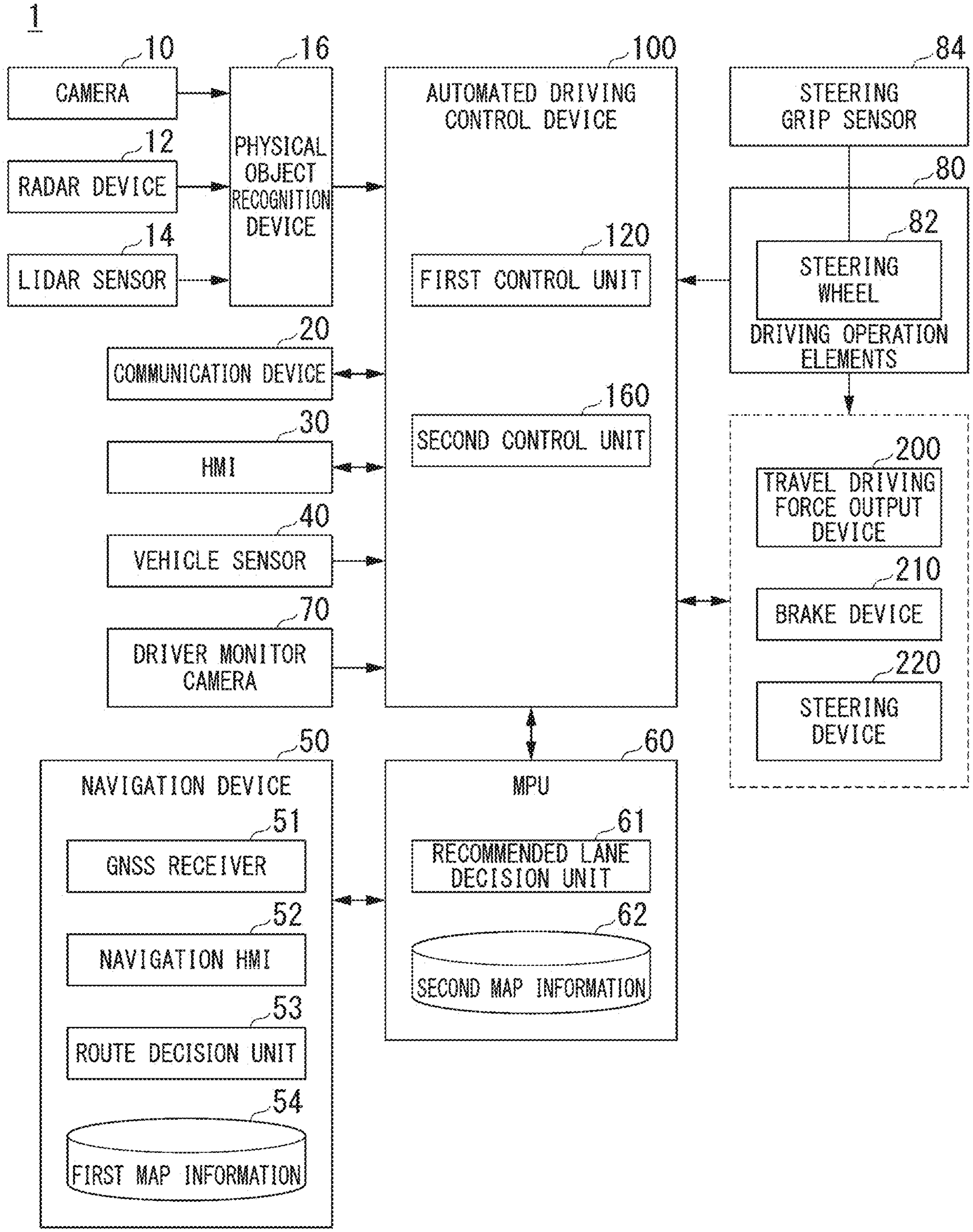
FIG. 1 is a configuration diagram of a vehicle system using a vehicle control device according to an embodiment.

FIG. 1 is a configuration diagram of a vehicle system 1 using the vehicle control device according to the present embodiment. A vehicle in which the vehicle system 1 is mounted is, for example, a vehicle such as a two-wheeled vehicle, a three-wheeled vehicle, or a four-wheeled vehicle, and a drive source thereof is an internal combustion engine such as a diesel engine or a gasoline engine, an electric motor, or a combination thereof. The electric motor operates using electric power generated by a power generation unit connected to the internal combustion engine or electric power that is supplied when a secondary battery or a fuel cell is discharged.

For example, the vehicle system 1 includes a camera 10, a radar device 12, a light detection and ranging (LIDAR) sensor 14, a physical object recognition device 16, a communication device 20, a human machine interface (HMI) 30, a vehicle sensor 40, a navigation device 50, a map positioning unit (MPU) 60, a driver monitor camera 70, driving operation elements 80, an automated driving control device 100, a travel driving force output device 200, a brake device 210, and a steering device 220. Such devices and equipment are connected to each other by a multiplex communication line such as a controller area network (CAN) communication line, a serial communication line, or a wireless communication network. Also, the configuration shown in FIG. 1 is merely an example and some of the components may be omitted or other components may be further added.

For example, the camera 10 is a digital camera using a solid-state imaging element such as a charge-coupled device (CCD) or a complementary metal oxide semiconductor (CMOS). The camera 10 is attached to any location on the vehicle (hereinafter, a host vehicle M) in which the vehicle system 1 is mounted. When the view in front of the host vehicle M is imaged, the camera 10 is attached to an upper part of a front windshield, a rear surface of a rearview mirror, or the like. For example, the camera 10 periodically and iteratively images the surroundings of the host vehicle M. The camera 10 may be a stereo camera.

The radar device 12 radiates radio waves such as millimeter waves around the host vehicle M and detects at least a position of a physical object (a distance to and a direction of the physical object) by detecting radio waves (reflected waves) reflected by the physical object. The radar device 12 is attached to any location on the host vehicle M. The radar device 12 may detect a position and speed of the physical object in a frequency modulated continuous wave (FM-CW) scheme.

The LIDAR sensor 14 radiates light (or electromagnetic waves of a wavelength close to an optical wavelength) to the vicinity of the host vehicle M and measures scattered light. The LIDAR sensor 14 detects a distance to an object on the basis of a period of time from light emission to light reception. The radiated light is, for example, pulsed laser light. The LIDAR sensor 14 is attached to any location on the host vehicle M.

The physical object recognition device 16 performs a sensor fusion process on detection results from some or all of the camera 10, the radar device 12, and the LIDAR sensor 14 to recognize a position, a type, a speed, and the like of a physical object. The physical object recognition device 16 outputs recognition results to the automated driving control device 100. The physical object recognition device 16 may output detection results of the camera 10, the radar device 12, and the LIDAR sensor 14 to the automated driving control device 100 as they are. The physical object recognition device 16 may be omitted from the vehicle system 1.

The communication device 20 communicates with another vehicle located in the vicinity of the host vehicle M using, for example, a cellular network, a Wi-Fi network, Bluetooth (registered trademark), dedicated short range communication (DSRC), or the like, or communicates with various types of server devices via a radio base station.

The HMI 30 provides an occupant of the host vehicle M with various types of information and receives an input operation from the occupant. The HMI 30 includes various types of display devices, a speaker, a buzzer, a touch panel, a switch, a key, and the like.

The vehicle sensor 40 includes a vehicle speed sensor configured to detect the speed of the host vehicle M, an acceleration sensor configured to detect acceleration, a yaw rate sensor configured to detect an angular speed around a vertical axis, a direction sensor configured to detect a direction of the host vehicle M, and the like.

For example, the navigation device 50 includes a global navigation satellite system (GNSS) receiver 51, a navigation HMI 52, and a route decision unit 53. The navigation device 50 holds first map information 54 in a storage device such as a hard disk drive (HDD) or a flash memory. The GNSS receiver 51 identifies a position of the host vehicle M on the basis of a signal received from a GNSS satellite. The position of the host vehicle M may be identified or supplemented by an inertial navigation system (INS) using an output of the vehicle sensor 40. The navigation HMI 52 includes a display device, a speaker, a touch panel, keys, and the like. The navigation HMI 52 may be partly or wholly shared with the above-described HMI 30. For example, the route decision unit 53 decides a route (hereinafter referred to as a route on a map) from the position of the host vehicle M identified by the GNSS receiver 51 (or any input position) to a destination input by the occupant using the navigation HMI 52 with reference to the first map information 54. The first map information 54 is, for example, information in which a road shape is expressed by a link indicating a road and nodes connected by the link. The first map information 54 may include curvature of a road, point of interest (POI) information, and the like. The route on the map is output to the MPU 60. The navigation device 50 may perform route guidance using the navigation HMI 52 on the basis of the route on the map. The navigation device 50 may be implemented, for example, according to a function of a terminal device such as a smartphone or a tablet terminal possessed by the occupant. The navigation device 50 may transmit a current position and a destination to a navigation server via the communication device 20 and acquire a route equivalent to the route on the map from the navigation server.

For example, the MPU 60 includes a recommended lane decision unit 61 and stores second map information 62 in a storage device such as an HDD or a flash memory. The recommended lane decision unit 61 divides the route on the map provided from the navigation device 50 into a plurality of blocks (for example, divides the route every 100 [m] in a travel direction of the vehicle), and decides a recommended lane for each block with reference to the second map information 62. The recommended lane decision unit 61 decides in what lane numbered from the left the vehicle will travel. The recommended lane decision unit 61 decides the recommended lane so that the host vehicle M can travel along a reasonable route for traveling to a branching destination when there is a branch point on the route on the map.

The second map information 62 is map information which has higher accuracy than the first map information 54. For example, the second map information 62 includes information about a center of a lane, information about a boundary of a lane, and the like. Also, the second map information 62 may include road information, traffic regulations information, address information (an address/postal code), facility information, telephone number information, information of a prohibition segment in which mode A or B to be described below is prohibited, and the like. The second map information 62 may be updated at any time when the communication device 20 communicates with another device.

The driver monitor camera 70 is, for example, a digital camera that uses a solid-state image sensor such as a CCD or a CMOS. The driver monitor camera 70 is attached to any location on the host vehicle M with respect to a position and a direction where the head of the occupant (hereinafter, the driver) sitting in the driver's seat of the host vehicle M can be imaged from the front (in a direction in which his/her face is imaged). For example, the driver monitor camera 70 is attached to an upper part of a display device provided on the central portion of the instrument panel of the host vehicle M.

For example, the driving operation elements 80 include an accelerator pedal, a brake pedal, a shift lever, and other operation elements in addition to a steering wheel 82. A sensor configured to detect an amount of operation or the presence or absence of an operation is attached to the driving operation element 80 and a detection result of the sensor is output to the automated driving control device 100 or some or all of the travel driving force output device 200, the brake device 210, and the steering device 220. The steering wheel 82 is an example of an "operation element that receives a steering operation by the driver." The operation element does not necessarily have to be annular and may be in the form of a variant steering wheel, a joystick, a button, or the like. A steering grip sensor 84 is attached to the steering wheel 82. The steering grip sensor 84 is implemented by a capacitance sensor or the like and outputs a signal for detecting whether or not the driver is gripping the steering wheel 82 (indicating that there is contact with the steering wheel 82 in a state in which a force is applied) to the automated driving control device 100.

The automated driving control device 100 includes, for example, a first control unit 120 and a second control unit 160. Each of the first control unit 120 and the second control unit 160 is implemented, for example, by a hardware processor such as a central processing unit (CPU) executing a program (software). Some or all of the above components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. The program may be pre-stored in a storage device (a storage device including a non-transitory storage medium) such as an HDD or a flash memory of the automated driving control device 100 or may be stored in a removable storage medium such as a DVD or a CD-ROM and installed in the HDD or the flash memory of the automated driving control device 100 when the storage medium (the non-transitory storage medium) is mounted in a drive device. The automated driving control device 100 including a determination unit 132 and a correction unit 134 to be described below is an example of a "vehicle control device."

Figure 2:
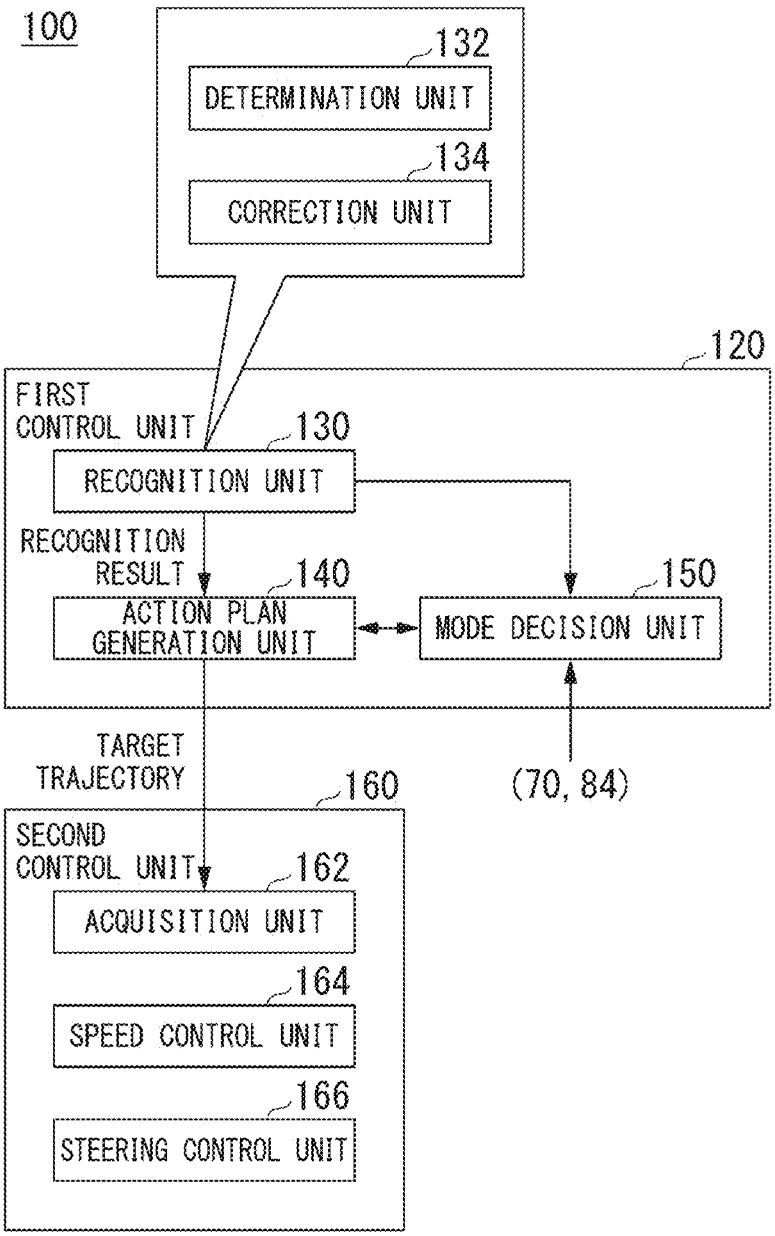
FIG. 2 is a functional configuration diagram of a first control unit and a second control unit.

FIG. 2 is a functional configuration diagram of the first control unit 120 and the second control unit 160. The first control unit 120 includes, for example, a recognition unit 130, the determination unit 132, the action plan generation unit 140, and a mode decision unit 150. For example, the first control unit 120 implements a function based on artificial intelligence (AI) and a function based on a previously given model in parallel. For example, an "intersection recognition" function may be implemented by executing intersection recognition based on deep learning or the like and recognition based on previously given conditions (signals, road markings, or the like, with which pattern matching is possible) in parallel and performing comprehensive evaluation by assigning scores to both recognitions. Thereby, the reliability of automated driving is secured.

The recognition unit 130 recognizes states of positions, speeds, acceleration, and the like of physical objects near the host vehicle M on the basis of information input from the camera 10, the radar device 12, and the LIDAR sensor 14 via the physical object recognition device 16. For example, the position of the physical object is recognized as a position on absolute coordinates with a representative point (a center of gravity, a driving shaft center, or the like) of the host vehicle M as the origin and is used for control. The position of the physical object may be represented by a representative point such as a center of gravity or a corner of the physical object or may be represented by an area. The "state" of a physical object may include acceleration or jerk of the physical object or an "action state" (for example, whether or not a lane change is being made or intended).

Also, for example, the recognition unit 130 recognizes a lane in which the host vehicle M is traveling (a travel lane). For example, the recognition unit 130 recognizes the travel lane by comparing a road marking pattern (which may be hereinafter referred to as a "map road marking") obtained from the second map information 62 with a road marking pattern (which may be hereinafter referred to as a "camera road marking") in the vicinity of the host vehicle M recognized from an image captured by the camera 10. More specifically, the determination unit 132 provided in the recognition unit 130, for example, calculates a deviation between the map road marking and the camera road marking and recognizes at least one of the map road marking and the camera road marking (or a midline thereof or the like) as a travel lane when it is determined that the calculated deviation is less than or equal to a threshold value (i.e., when it is determined that they match each other). In addition, the recognition unit 130 may recognize the travel lane by recognizing a road marking and a course boundary (a road boundary) including a shoulder, a curb, a median strip, a guardrail, and the like as well as a road marking. In this recognition, a position of the host vehicle M acquired from the navigation device 50 and a processing result of the INS may be taken into account. Also, the recognition unit 130 recognizes a temporary stop line, an obstacle, red traffic light, a toll gate, and other road events.

When the travel lane is recognized, the recognition unit 130 recognizes a position or an orientation of the host vehicle M with respect to the travel lane. For example, the recognition unit 130 may recognize a deviation of a reference point of the host vehicle M from the center of the lane and an angle formed between the travel direction of the host vehicle M and a line connected to the center of the lane as a relative position and orientation of the host vehicle M related to the travel lane. Alternatively, the recognition unit 130 may recognize a position of the reference point of the host vehicle M related to one side end portion (a road marking or a road boundary) of the travel lane or the like as a relative position of the host vehicle M related to the travel lane.

When it is determined that the map road marking matches the camera road marking, the correction unit 134 provided in the recognition unit 130 corrects the map road marking so that the map road marking is aligned with the recognized camera road marking (in other words, corrects the position of the host vehicle M on the second map information 62). More specifically, first, the correction unit 134 identifies the position of the host vehicle M (for example, including the distance and the direction of the host vehicle M) on the basis of the recognized camera road marking from the camera image. Because it is determined that the map road marking matches the camera road marking, the correction unit 134 equates the map road marking and the camera road marking and identifies the position of the host vehicle M based on the camera road marking as the position of the host vehicle M based on the map road marking (for example, a position as GNSS coordinates). Thereby, the correction unit 134 can correct and decide the position of the host vehicle M based on the identified map road marking as the position of the host vehicle M on the second map information 62.

In principle, the action plan generation unit 140 travels in the recommended lane decided by the recommended lane decision unit 61 and further generates a target trajectory along which the host vehicle M will automatically travel (independently of the operation of the driver) so that the approach to a physical object (other than a road marking, a road sign, a manhole, and the like across which the host vehicle M can move) recognized by the recognition unit 130 is avoided. For example, the recognition unit 130 sets a risk area centered on the physical object whose state is output and the recognition unit 130 sets a risk as an index value indicating a degree to which the host vehicle M should not approach within the risk area. The action plan generation unit 140 generates a target trajectory so that the host vehicle M does not pass a point where the risk is greater than or equal to a predetermined value and travels within the recognized travel lane. Because physical objects include mobile objects, a risk distribution is not one for each control cycle, but is set for a plurality of points in the future in consideration of the future position of the physical object predicted on the basis of the speed of the physical object. For example, the target trajectory is represented by sequentially arranging points (trajectory points) at which the host vehicle M is required to arrive. The trajectory points are points at which the host vehicle M is required to arrive for each predetermined traveling distance (for example, about several meters [m]) along a road. In addition, a target speed and target acceleration for each predetermined sampling time (for example, about 0.x [sec] where x is a decimal number) are generated as parts of the target trajectory. Also, the trajectory point may be a position where the host vehicle M is required to arrive at the sampling time for each predetermined sampling time. In this case, information of the target speed or the target acceleration is represented by an interval between the trajectory points.

Furthermore, in the present embodiment, when the determination unit 132 determines that the map road marking and the camera road marking match each other for at least one side, the action plan generation unit 140 generates a target trajectory so that the host vehicle M travels along the map road marking and the camera road marking matching each other (at least in consideration thereof). As an example, the action plan generation unit 140 generates a target trajectory for traveling a predetermined distance and traveling to a shifted point from the map road marking and the camera road marking matching each other.

The action plan generation unit 140 may set an automated driving event (function) when a target trajectory is generated. Automated driving events include a constant-speed travel event, a low-speed tracking travel event, a lane change event, a branch-point-related travel event, a merging-point-related travel event, a takeover event, and the like. The action plan generation unit 140 generates a target trajectory according to an activated event.

The mode decision unit 150 decides a driving mode of the host vehicle M as any one of a plurality of driving modes having different tasks imposed on the driver. FIG. 3 is a diagram showing an example of corresponding relationships between the driving modes, the control states of the host vehicle M, and the tasks. For example, there are five modes from mode A to mode E as the driving modes of the host vehicle M. A control state, i.e., a degree of automation of the driving control of the host vehicle M, is highest in mode A, lower in the order of mode B, mode C, and mode D, and lowest in mode E. In contrast, a task imposed on the driver is lightest in mode A, heavier in the order of mode B, mode C, and mode D, and heaviest in mode E. Because of a control state that is not automated driving in modes D and E, the automated driving control device 100 is responsible for ending control related to automated driving and shifting the driving mode to driving assistance or manual driving. The content of the driving modes will be exemplified below.

In mode A, in an automated driving state, neither forward monitoring nor gripping of the steering wheel 82 (a steering grip in the drawing) is imposed on the driver. However, even in mode A, the driver is required to be in a posture where the fast shift to manual driving is enabled in response to a request from the system centered on the automated driving control device 100. The term "automated driving" as used herein indicates that both steering and acceleration/deceleration are controlled independently of the operation of the driver. The term "forward region or direction" indicates a space in a travel direction of the host vehicle M that is visually recognized via the front windshield. Mode A is, for example, a driving mode in which the host vehicle M travels at a predetermined speed (for example, about 50 [km/h]) or lower on a motorway such as an expressway and which can be executed when a condition in which there is a tracking target preceding vehicle or the like is satisfied. Mode A may be referred to as a traffic jam pilot (TJP). When this condition is no longer satisfied, the mode decision unit 150 changes the driving mode of the host vehicle M to mode B.

In mode B, in a driving assistance state, a task of monitoring a forward direction of the host vehicle M (hereinafter referred to as forward monitoring) is imposed on the driver, but a task of gripping the steering wheel 82 is not imposed on the driver. In mode C, in a driving assistance state, a forward monitoring task and a task of gripping the steering wheel 82 are imposed on the driver. In mode D, a task in which a certain degree of driving operation is required for at least one of steering and acceleration/deceleration of the host vehicle M is imposed on the driver. For example, in mode D, driving assistance such as adaptive cruise control (ACC) or a lane keeping assist system (LKAS) is performed. In mode E, manual driving in which a task requiring a driving operation for both steering and acceleration/deceleration is imposed on the driver is performed. In both modes D and E, a task of monitoring a forward direction of the host vehicle M is naturally imposed on the driver.

The driving mode is not limited to that exemplified in FIG. 3 and may be defined by other definitions. For example, there may be a driving mode having a loose and severe threshold value for determining that the steering wheel is gripped among the driving modes required for the forward monitoring and the steering grip. More specifically, it is only necessary for either the driver's left or right hand to be in contact with the steering wheel 82 in a certain driving mode, but the driving mode may be defined so that the driver needs to grip the steering wheel 82 with both hands with a force greater than or equal to the threshold value in another driving mode in which the task imposed on the driver is heavier. In addition, the driving mode in which the severity of the task imposed on the driver is different may be defined in any way.

The automated driving control device 100 (and the driving assistance device (not shown)) makes an automated lane change corresponding to the driving mode. Automated lane changes include an automated lane change (1) due to a system request and an automated lane change (2) due to a driver request. Examples of the automated lane change (1) include an automated lane change for passing performed when the speed of the preceding vehicle is less than the speed of the host vehicle by a reference level or higher and an automated lane change for traveling toward a destination (an automated lane change based on a change in a recommended lane). In the automated lane change (2), if a condition related to a speed, a positional relationship associated with a nearby vehicle, or the like is satisfied, the host vehicle M is allowed to change the lane in an operation direction when a direction indicator has been operated by the driver.

The automated driving control device 100 does not execute either of the automated lane changes (1) and (2) in mode A. The automated driving control device 100 executes both automated lane changes (1) and (2) in modes B and C. The driving assistance device (not shown) does not execute the automated lane change (1) but executes the automated lane change (2) in mode D. In mode E, neither of the automated lane changes (1) and (2) is executed.

The mode decision unit 150 changes the driving mode of the host vehicle M to a driving mode in which a task is heavier when the task associated with the decided driving mode (hereinafter referred to as a current driving mode) is not executed by the driver.

For example, in mode A, when the driver is in a posture where he/she cannot shift the driving to manual driving in response to a request from the system (for example, when he/she continues to look outside an allowable area or when a sign that driving is difficult is detected), the mode decision unit 150 performs a control process of prompting the driver to shift the driving to manual driving using the HMI 30, causing the host vehicle M to gradually stop close to the road shoulder when the driver does not respond, and stopping the automated driving. After the automated driving is stopped, the host vehicle M is in a state of mode D or E. Thereby, the host vehicle M can be started according to the manual driving of the driver. Hereinafter, the same is true for "stopping of automated driving." When the driver is not performing forward monitoring in mode B, the mode decision unit 150 performs a control process of prompting the driver to perform the forward monitoring using the HMI 30, causing the host vehicle M to gradually stop close to the road shoulder when the driver does not respond, and stopping the automated driving. When the driver is not performing forward monitoring or is not gripping the steering wheel 82 in mode C, the mode decision unit 150 performs a control process of prompting the driver to perform the forward monitoring and/or grip the steering wheel 82 using the HMI 30, causing the host vehicle M to gradually stop close to the road shoulder when the driver does not respond, and stopping the automated driving.

The mode decision unit 150 further monitors the state of the driver for the above-described mode change and determines whether or not the state of the driver is a state corresponding to the task. For example, the mode decision unit 150 analyzes the image captured by the driver monitor camera 70 and performs a posture estimation process and determines whether or not the driver is in a posture that cannot be shifted to manual driving in response to a request from the system. Moreover, the driver state determination unit 152 analyzes the image captured by the driver monitor camera 70 and performs a visual line estimation process and determines whether or not the driver is performing forward monitoring.

Moreover, in the present embodiment, the mode decision unit 150 changes the driving mode of the host vehicle M to a driving mode with a heavier task when the determination unit 132 determines that the map road marking does not match the camera road marking for both sides. For example, the mode decision unit 150 changes the driving mode to mode C or a mode having a heavier task when it is determined that the map road marking and the camera road marking do not match for both sides while the host vehicle M is traveling in a driving mode (mode A or B) that does not require the steering grip.

The mode decision unit 150 performs various types of processes for the mode change. For example, the mode decision unit 150 instructs the action plan generation unit 140 to generate a target trajectory for stopping on the road shoulder, instructs a driving assistance device (not shown) to operate, or controls the HMI 30 for prompting the driver to take an action.

The second control unit 160 controls the travel driving force output device 200, the brake device 210, and the steering device 220 so that the host vehicle M passes along the target trajectory generated by the action plan generation unit 140 at the scheduled times.

Returning to FIG. 2, the second control unit 160 includes, for example, an acquisition unit 162, a speed control unit 164, and a steering control unit 166. The acquisition unit 162 acquires information of a target trajectory (trajectory points) generated by the action plan generation unit 140 and causes a memory (not shown) to store the information. The speed control unit 164 controls the travel driving force output device 200 or the brake device 210 on the basis of a speed element associated with the target trajectory stored in the memory. The steering control unit 166 controls the steering device 220 in accordance with a degree of curvature of the target trajectory stored in the memory. The processes of the speed control unit 164 and the steering control unit 166 are implemented by, for example, a combination of feedforward control and feedback control. As an example, the steering control unit 166 executes feedforward control according to the curvature of the road in front of the host vehicle M and feedback control based on a deviation from the target trajectory in combination.

The travel driving force output device 200 outputs a travel driving force (torque) for enabling the traveling of the vehicle to driving wheels. For example, the travel driving force output device 200 includes a combination of an internal combustion engine, an electric motor, a transmission, and the like, and an electronic control unit (ECU) that controls the internal combustion engine, the electric motor, the transmission, and the like. The ECU controls the above-described components in accordance with information input from the second control unit 160 or information input from the driving operation element 80.

For example, the brake device 210 includes a brake caliper, a cylinder configured to transfer hydraulic pressure to the brake caliper, an electric motor configured to generate hydraulic pressure in the cylinder, and a brake ECU. The brake ECU controls the electric motor in accordance with the information input from the second control unit 160 or the information input from the driving operation element 80 so that brake torque according to a braking operation is output to each wheel. The brake device 210 may include a mechanism configured to transfer the hydraulic pressure generated according to an operation on the brake pedal included in the driving operation elements 80 to the cylinder via a master cylinder as a backup. Also, the brake device 210 is not limited to the above-described configuration and may be an electronically controlled hydraulic brake device configured to control an actuator in accordance with information input from the second control unit 160 and transfer the hydraulic pressure of the master cylinder to the cylinder.

For example, the steering device 220 includes a steering ECU and an electric motor. For example, the electric motor changes a direction of steerable wheels by applying a force to a rack and pinion mechanism. The steering ECU drives the electric motor in accordance with the information input from the second control unit 160 or the information input from the driving operation element 80 to change the direction of the steerable wheels.

[Process During One-Sided Loss/One-Sided Match]

As described above, the determination unit 132 compares the map road marking with the camera road marking for both sides and the action plan generation unit 140 generates a target trajectory for the host vehicle M to travel along the map road marking and the camera road marking matching each other when it is determined that the map road marking and the camera road marking match for at least one side. However, for example, when recognition fails (or is lost) for the camera road marking for one side, misrecognition of the camera road marking for the other side (for example, misrecognition of the road curb as the camera road marking) occurs, and further the map road marking matches the camera road marking for the other side where the misrecognition has occurred, the correction unit 134 corrects the map road marking so that the map road marking is aligned with the camera road marking for the other side where the misrecognition has occurred. As a result, lateral swaying may occur in the host vehicle M traveling along the camera road marking or the map road marking for the other side and the stability of automated driving or driving assistance may be impaired.

Figure 4:
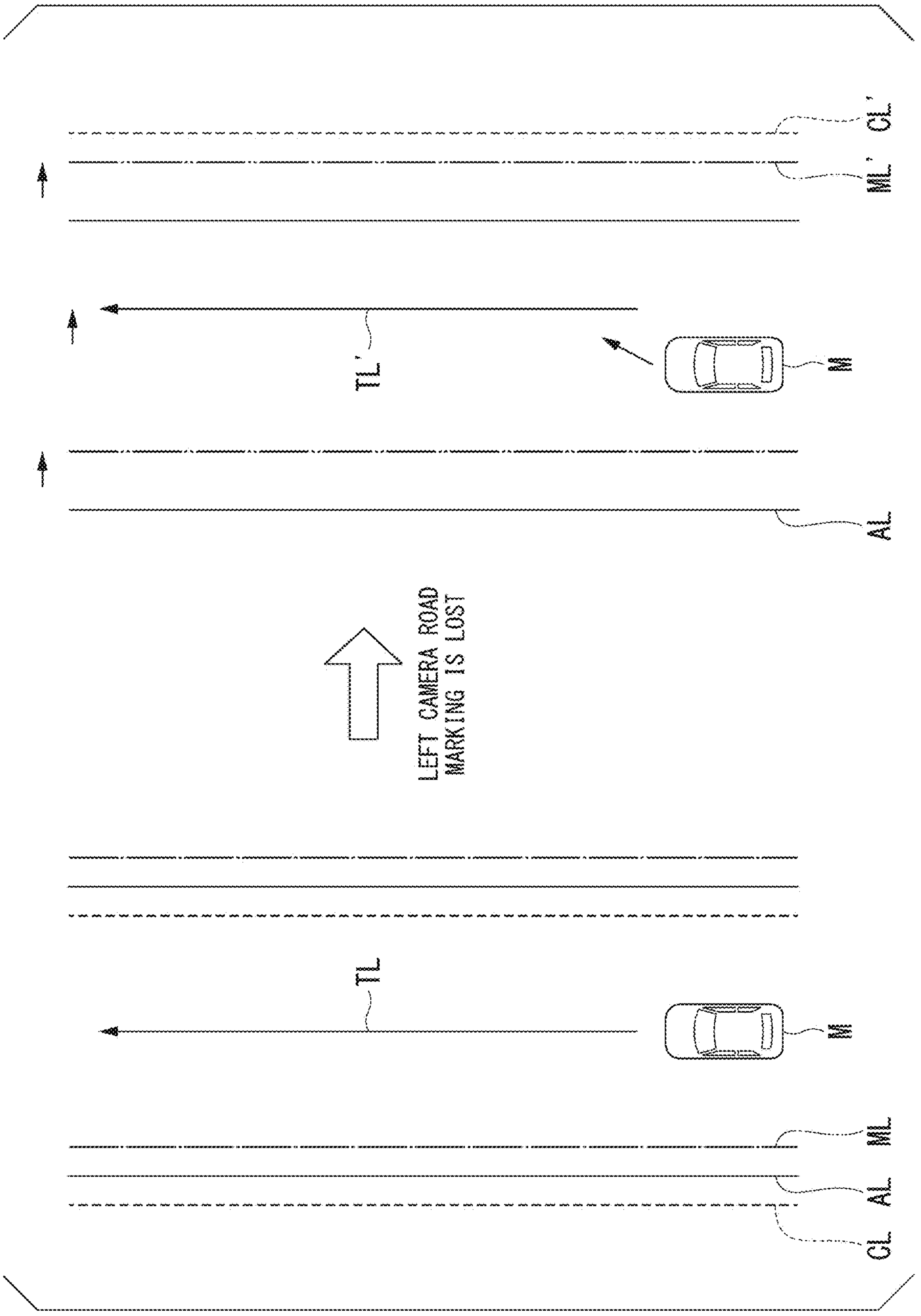
FIG. 4 is a diagram showing an example of lateral swaying of a vehicle caused by correcting a map road marking so that the map road marking is aligned with the other camera road marking where misrecognition has occurred.

FIG. 4 is a diagram showing an example of the lateral swaying of the host vehicle M caused by correcting the map road marking so that the map road marking is aligned with the camera road marking for the other side where the misrecognition has occurred. In the left portion of FIG. 4, reference sign CL denotes a camera road marking, reference sign ML denotes a map road marking before correction, reference sign AL denotes an actual road marking, and reference sign TL denotes a target trajectory generated by the action plan generation unit 140. The left portion of FIG. 4 shows a situation in which the determination unit 132 determines that the map road marking ML and the camera road marking CL match each other for both sides.

Thereafter, as shown in the right portion of FIG. 4, it is assumed that a misrecognition occurs for the camera road marking CL on the right side (hereinafter, the camera road marking on which the misrecognition has occurred may be denoted by CL') and the camera road marking CL' on which the misrecognition has occurred matches the map road marking ML simultaneously when the camera road marking CL on the left side is lost. In this case, as described above, the correction unit 134 corrects the map road marking ML to be aligned with the recognized camera road marking CL' and obtains the map road marking ML' after the correction. Thereby, the map road marking ML' after the correction is shifted to the camera road marking CL' side (shifted to the right side in FIG. 4) compared to the map road marking ML before the correction. As a result, the action plan generation unit 140 also shifts the target trajectory TL to obtain a target trajectory TL' after the shift. Because the target trajectory TL' is shifted laterally compared to the target trajectory TL, lateral swaying occurs in the host vehicle M traveling according to automated driving or driving assistance.

To prevent the lateral swaying caused by the above-described event, the action plan generation unit 140 according to the present embodiment compares a first self-position calculated on the basis of the map road marking before the correction and odometry information of the host vehicle M with a second self-position calculated on the basis of the corrected map road marking or the recognized camera road marking when the camera road marking for one side is lost and the camera road marking and the map road marking for the other side match each other (hereinafter simply referred to as "one-sided loss/one-sided match"). Here, the odometry information is, for example, parameters such as acceleration, wheel speed, and orientation of the host vehicle M or information indicating a future position of the host vehicle M predicted from these parameters. The odometry information is an example of a "travel state" within the scope of the claims. When the error between the first self-position and the second self-position is greater than or equal to a first threshold value th1, the action plan generation unit 140 generates the target trajectory TL for traveling to a position based on the map road marking before correction. This is because it is assumed that there is a high possibility that misrecognition will occur in the camera road marking (or the corrected map road marking) from which the second self-position is calculated when the error between the first self-position and the second self-position is large.

Figure 5:
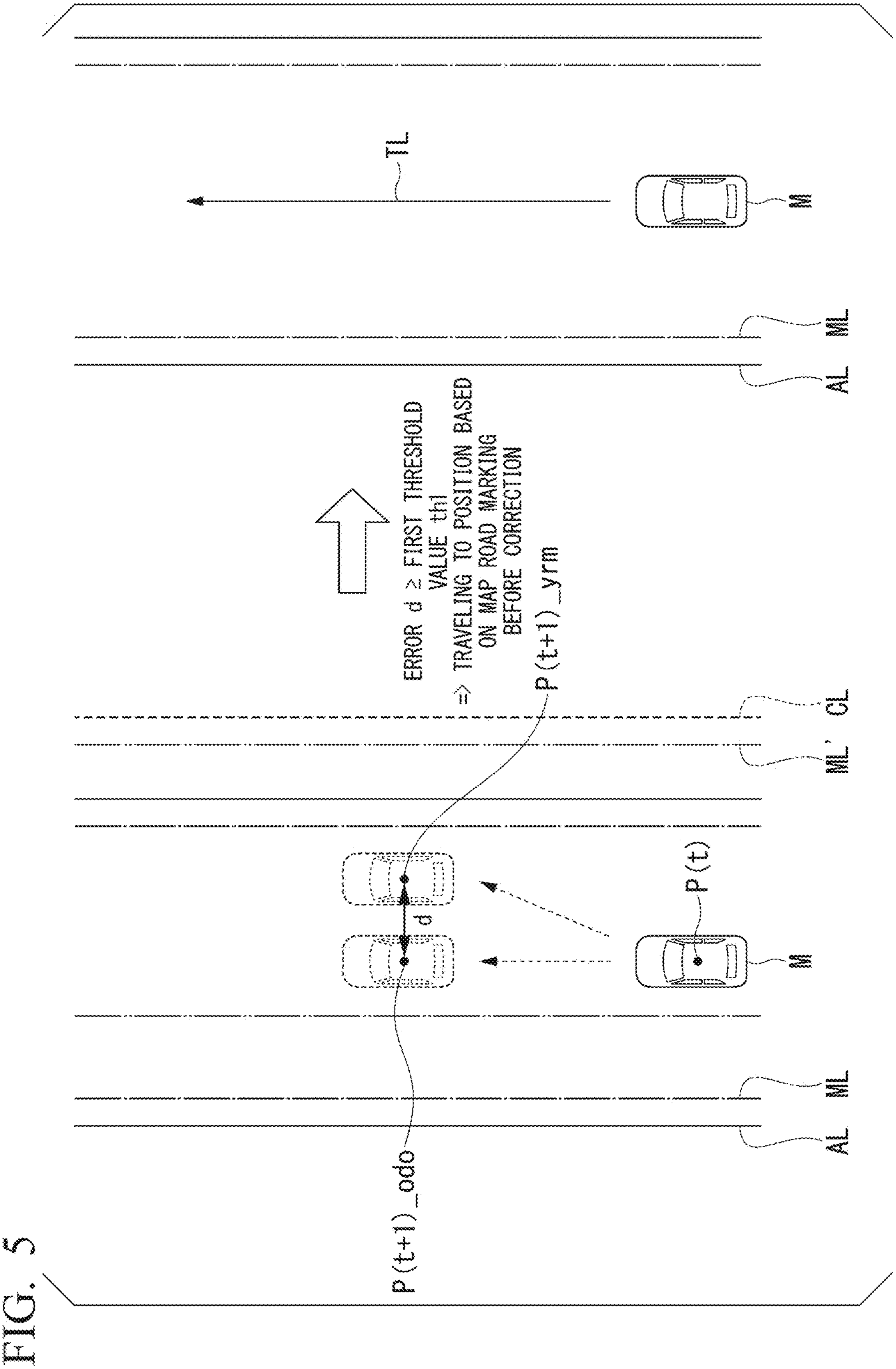
FIG. 5 is an explanatory diagram of the calculation of a first self-position and a second self-position and the determination based on the first self-position and the second self-position that have been calculated.

FIG. 5 is an explanatory diagram of the calculation of the first self-position and the second self-position and the determination based on the calculated first self-position and the calculated second self-position. The left portion of FIG. 5 shows an example of a situation in which the camera road marking and the map road marking match each other for both sides, at time t but the one-sided loss/one-sided match occurs at time t+1.

As shown in FIG. 5, when the one-sided loss/one-sided match occurs, the action plan generation unit 140 first performs a calculation process by designating a position P(t) of the host vehicle M based on the map road marking ML before correction as the origin and designating a self-position P(t+1)_odo of the host vehicle M at time t+1 as the first self-position using the odometry information at time t. At the same time, the action plan generation unit 140 calculates a self-position P(t+1)_yrm of the host vehicle M based on the matched one-sided camera road marking CL or the map road marking ML' after the correction as the second self-position. At this time, the correction unit 134 may correct the self-position by performing the application of a complementary filter, the calculation of a median, a process of weighting, or the like for the calculated first self-position P(t+1)_odo and the second self-position P(t+1)_yrm, and recognize the corrected self-position as a final self-position P(t)_lm.

Subsequently, the action plan generation unit 140 calculates an error d between the calculated first self-position P(t+1)_odo and the calculated second self-position P(t+1)_yrm and determines whether or not the calculated error d is greater than or equal to the first threshold value th1. When it is determined that the calculated error d is greater than or equal to the first threshold value th1, the action plan generation unit 140 generates a target trajectory TL for traveling to a position based on the map road marking ML before the correction without using the recognized one-sided camera road marking CL or the map road marking ML' after the correction and the second control unit 160 controls the host vehicle M so that the host vehicle M travels along the generated target trajectory TL as shown in the right portion of FIG. 5. Here, the position based on the map road marking ML before the correction is a position calculated on the basis of at least one of the map road markings ML for both sides and the action plan generation unit 140 generates a midline of the map road markings ML for both sides as the target trajectory TL as an example in FIG. 5.

Figure 6:
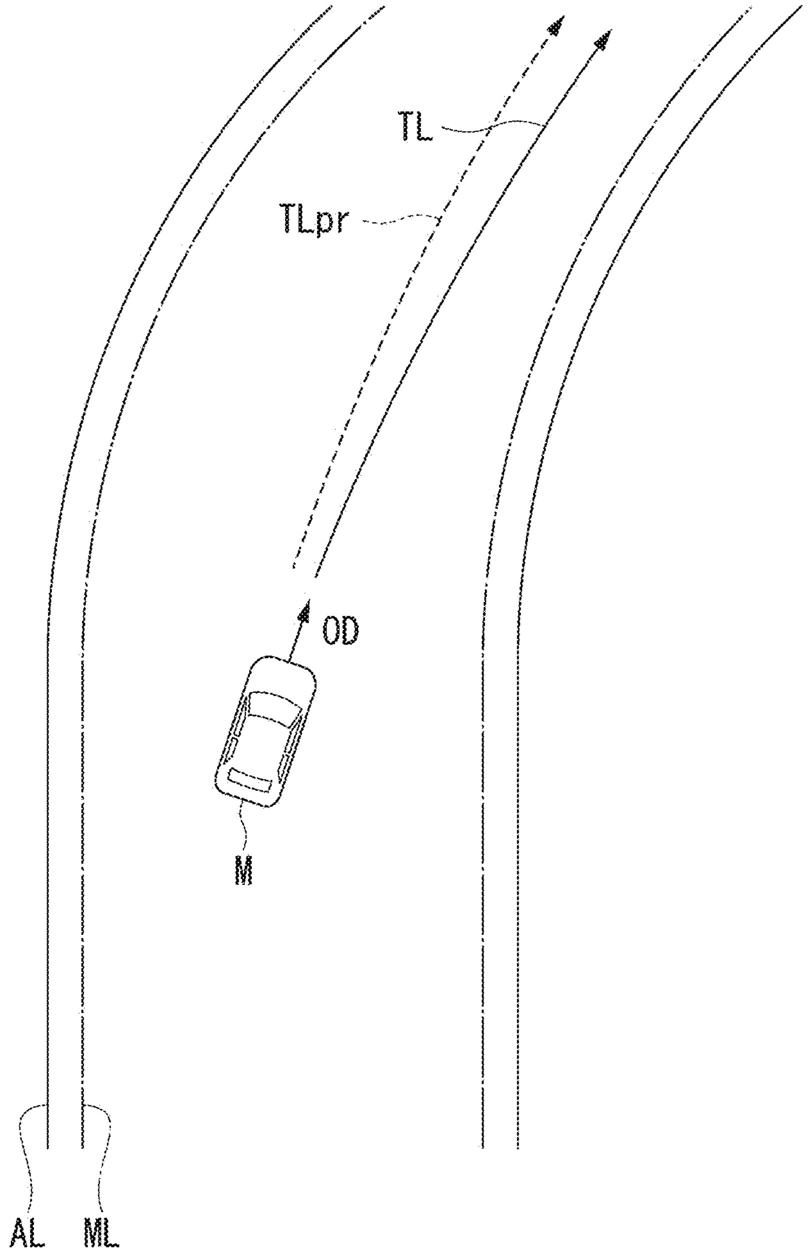
FIG. 6 is an explanatory diagram of a method for calculating a position based on a map road marking ML before correction using odometry information.

Furthermore, as another example, the action plan generation unit 140 may calculate the target trajectory TL using the odometry information. FIG. 6 is an explanatory diagram of a method for calculating the target trajectory TL using the odometry information. In FIG. 6, reference sign $TL_{pr}$ denotes a target trajectory in a control cycle immediately before the one-sided loss/one-sided match occurs, and reference sign OD denotes odometry information of the host vehicle M in the control cycle immediately before the one-sided loss/one-sided match occurs. As shown in FIG. 6, the action plan generation unit 140 may predict a future position where the host vehicle M travels under the assumption of the odometry information OD and calculate the final target trajectory TL by correcting the target trajectory $TL_{pr}$ using the predicted future position. For example, the action plan generation unit 140 may decide a midline of the predicted trajectory of the future position and the target trajectory $TL_{pr}$ as the final target trajectory TL. Moreover, as another example, the action plan generation unit 140 may decide the trajectory of the future position where the host vehicle M travels as the target trajectory TL as it is under the assumption of odometry information OD.

Thus, when the one-sided loss/one-sided match occurs and it is determined that the error d between the first self-position and the second self-position is greater than or equal to the first threshold value th1, the action plan generation unit 140 generates the target trajectory TL as a position based on the map road marking ML immediately before the one-sided loss/one-sided match occurs and continues automated driving or driving assistance for the host vehicle M. Subsequently, when a predetermined period has elapsed or the one-sided loss/one-sided match is still not eliminated after the host vehicle M travels a predetermined distance, the mode decision unit 150 changes the driving mode of the host vehicle M to a driving mode in which the task is heavier. On the other hand, when the one-sided loss/one-sided match is eliminated, for example, when the map road marking ML and the camera road marking CL match for both sides, the mode decision unit 150 maintains the driving mode of the host vehicle M.

In the above description, for simplicity of description, the action plan generation unit 140 calculates the first self-position and the second self-position only once and determines whether or not an error d between the first self-position and the second self-position is greater than or equal to the first threshold value th1. However, in practice, the action plan generation unit 140 calculates the first self-position and the second self-position in a plurality of calculation processes in a plurality of control cycles and generates the target trajectory TL so that traveling to a position based on the map road marking ML is performed when errors d between the first self-position and the second self-position obtained in the plurality of calculation processes are continuously greater than or equal to the first threshold value th1 and any one of the errors d obtained in the plurality of calculation processes is greater than or equal to a second threshold value th2 so that the more reliable determination is made and the control is stabilized. Here, the second threshold value th2 is a predetermined value greater than the first threshold value th1. Alternatively, when the errors d between the first self-position and the second self-position obtained in the plurality of calculation processes are continuously greater than or equal to the first threshold value th1 and any one of the errors d obtained in the plurality of calculation processes is greater than or equal to the second threshold value th2, the action plan generation unit 140 may generate a target trajectory TL for traveling to a position based on the map road marking ML before correction.

Further, in the above description, when the one-sided loss/one-sided match occurs and it is determined that the error d between the first self-position and the second self-position is greater than or equal to the first threshold value th1, the action plan generation unit 140 generates a target trajectory TL for traveling to a position based on the map road marking ML before correction. However, the present invention is not limited to this configuration and the action plan generation unit 140 may generate the target trajectory TL for traveling to a position based on the map road marking ML' after the correction. In this case, for example, the action plan generation unit 140 may set a map road marking ML" after additional correction between the map road marking ML before correction and the map road marking ML' after the correction completely aligned with the matched camera road marking instead of the map road marking ML' after the correction completely aligned with the matched camera road marking and the action plan generation unit 140 may generate the target trajectory L along the map road marking ML". In other words, the map road marking ML" can also be expressed as a map road marking offset from the map road marking ML before the correction without coinciding with the matched camera road marking side. The map road marking ML" is an example of "a one-sided map road marking after re-correction" within the scope of the claims.

Figure 7:
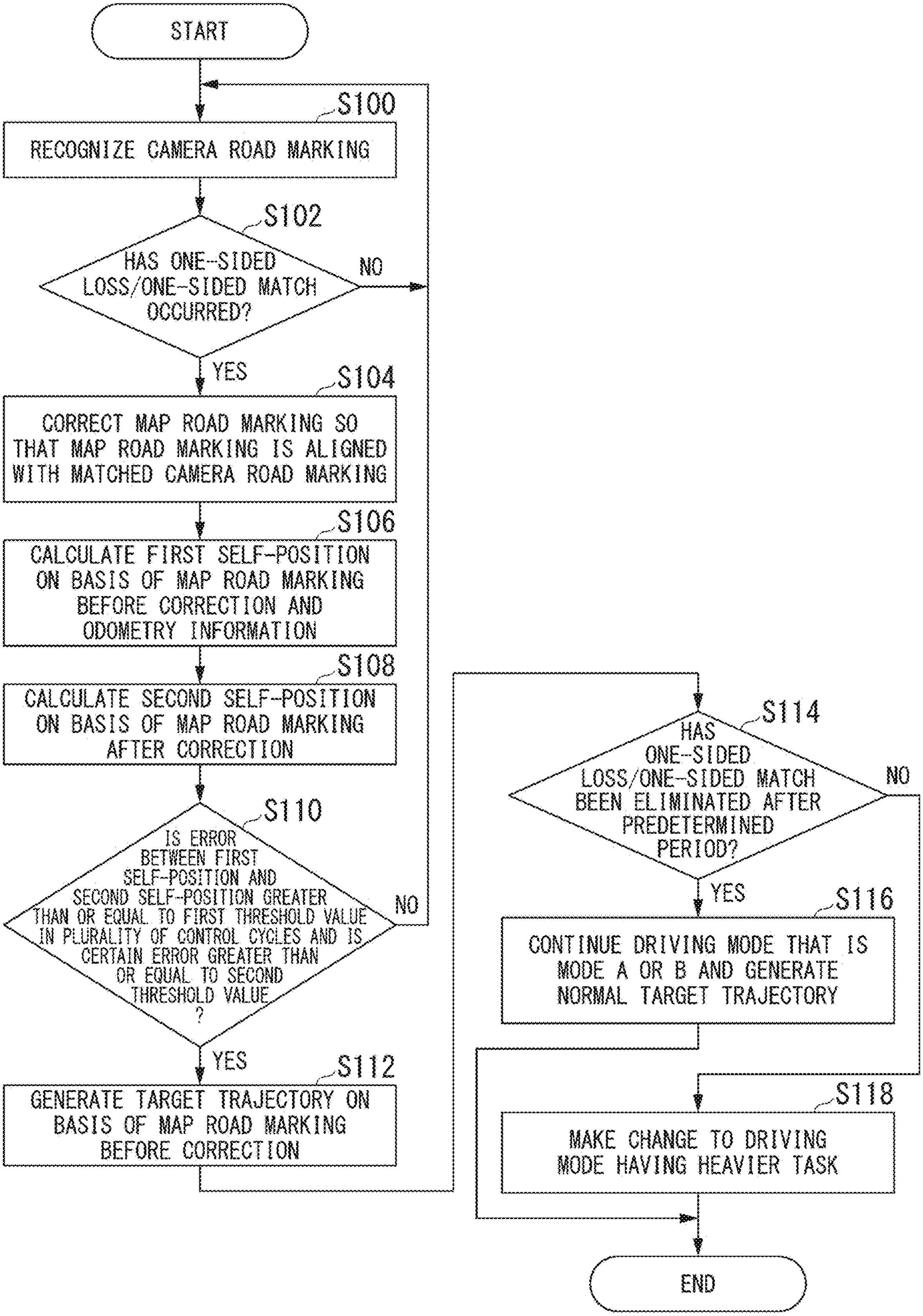
FIG. 7 is a flowchart showing an example of a flow of a process executed by an automated driving control device.

Next, a flow of a process executed by the automated driving control device 100 will be described with reference to FIG. 7. FIG. 7 is a flowchart showing an example of a flow of a process executed by the automated driving control device 100. The process of the flowchart shown in FIG. 7, for example, is iteratively executed while the host vehicle M is traveling in automated driving (mode A) or driving assistance (mode B).

First, the recognition unit 130 recognizes a camera road marking CL on the basis of an image captured by the camera 10 (step S100). Subsequently, the determination unit 132 compares the camera road marking with the map road marking to determine whether or not the one-sided loss/one-sided match has occurred (step S102). When it is determined that the one-sided loss/one-sided match has not occurred, the automated driving control device 100 returns the process to step S100.

On the other hand, when it is determined that the one-sided loss/one-sided match has occurred, the correction unit 134 corrects the map road marking so that the map road marking is aligned with the matched camera road marking (step S104). Subsequently, the action plan generation unit 140 calculates a first self-position on the basis of the map road marking before correction and odometry information of the host vehicle M in a control cycle immediately before the one-sided loss/one-sided match occurs (step S106). Subsequently, the action plan generation unit 140 calculates a second self-position on the basis of the map road marking after the correction (step S108).

Subsequently, the action plan generation unit 140 determines whether errors between the first self-position and the second self-position calculated in a plurality of control cycles are greater than or equal to the first threshold value th1 and a certain error is greater than or equal to the second threshold value th2 (step S110). When it is determined that the errors between the first self-position and the second self-position calculated in the plurality of control cycles are not greater than or equal to the first threshold value th1 or any error among the calculated errors is not greater than or equal to the second threshold value th2, the automated driving control device 100 returns the process to step S100.

On the other hand, when it is determined that the errors between the first self-position and the second self-position calculated in the plurality of control cycles are greater than or equal to the first threshold value th1 or a certain error among the calculated errors is greater than or equal to the second threshold value th2, the action plan generation unit 140 generates a target trajectory based on the map road marking before the correction (step S112). Subsequently, the mode decision unit 150 determines whether or not the one-sided loss/one-sided match has been eliminated after a predetermined period (step S114).

When it is determined that the one-sided loss/one-sided match has been eliminated after the predetermined period, the mode decision unit 150 continues the driving mode that is mode A or B and performs normal target trajectory generation (step S116). On the other hand, when it is determined that the one-sided loss/one-sided match has not been eliminated after the predetermined period, the mode decision unit 150 changes the driving mode to a driving mode in which the task is heavier (step S118). Thereby, the process of the present flowchart is completed.

In the flowchart of FIG. 7, in step S112, the action plan generation unit 140 generates a target trajectory on the basis of the map road marking before correction. However, as described above, the action plan generation unit 140 may generate a target trajectory on the basis of the map road marking after re-correction.

According to the above-described present embodiment, when the one-sided loss/one-sided match occurs while the host vehicle M is traveling with automated driving or driving assistance, the first self-position of the host vehicle M is calculated on the basis of the odometry information of the host vehicle M and the matched one-sided map road marking and the second self-position of the host vehicle M based on the one-sided map road marking after the correction or the recognized one-sided camera road marking is calculated. When an error between the first self-position and the second self-position is greater than or equal to a threshold value, the travel control for the host vehicle Mis performed so that the host vehicle M travels to the position based on the map road marking before the correction. Thereby, even if there is an error in recognition of a road marking only for one side and there is a mismatch with map information, the stability of automated driving can be ensured.

The embodiment described above can be represented as follows.

A vehicle control device including:

a storage device storing a program; and a hardware processor, the hardware processor executing the program to:

recognize a road marking located in a travel direction of a vehicle;

determine whether or not the recognized road marking matches a map road marking based on map information stored in a storage unit and determine whether or not a one-sided road marking that has been recognized matches a one-sided map road marking when the road marking has been recognized only for one side;

correct the one-sided map road marking on the basis of the recognized one-sided road marking when it is determined that the recognized one-sided road marking matches the one-sided map road marking;

perform travel control for the vehicle; and calculate a first self-position of the vehicle based on the one-sided map road marking before the correction on the basis of a travel state of the vehicle, calculate a second self-position of the vehicle based on the one-sided map road marking after the correction or the recognized one-sided road marking, and perform the travel control for the vehicle so that the vehicle travels to a position based on the map road marking before the correction when an error between the first self-position and the second self-position is greater than or equal to a first threshold value.

Although modes for carrying out the present invention have been described above using embodiments, the present invention is not limited to the embodiments and various modifications and substitutions can also be made without departing from the scope and spirit of the present invention.

What is claimed is:

1. A vehicle control device comprising:

a storage medium storing computer-readable instructions; and a processor connected to the storage medium, the processor executing the computer-readable instructions to:

recognize a road marking located in a travel direction of a vehicle, determine whether or not the recognized road marking matches a map road marking based on map information stored in a storage unit and determine whether or not a one-sided road marking that has been recognized matches a one-sided map road marking when the road marking has been recognized only for one side, correct the one-sided map road marking on the basis of the recognized one-sided road marking when it is determined that the recognized one-sided road marking matches the one-sided map road marking, and perform travel control for the vehicle, wherein the processor calculates a first self-position of the vehicle based on the one-sided map road marking before the correction on the basis of a travel state of the vehicle, calculates a second self-position of the vehicle based on the one-sided map road marking after the correction or the recognized one-sided road marking, and performs the travel control for the vehicle so that the vehicle travels to a position based on the map road marking before the correction when an error between the first self-position and the second self-position is greater than or equal to a first threshold value.

2. The vehicle control device according to claim 1, wherein the position based on the map road marking before the correction is a position located between two or more map road markings.

3. The vehicle control device according to claim 1, wherein the position based on the map road marking before the correction is a future position predicted from the travel state when the vehicle has traveled on the basis of the map road marking before the correction.

4. The vehicle control device according to claim 1, wherein the position based on the map road marking before the correction is a position obtained by correcting a position located between two or more map road markings according to a future position predicted from the travel state in which the vehicle has traveled on the basis of the map road marking before the correction.

5. The vehicle control device according to claim 1, wherein the processor performs the travel control for the vehicle so that the vehicle travels to the position based on the map road marking before the correction when errors between the first self-position and the second self-position obtained in a plurality of calculation processes are greater than or equal to the first threshold value and any one of the errors obtained in the plurality of calculation processes is greater than or equal to a second threshold value.

6. The vehicle control device according to claim 1, wherein the processor stops the travel control for the vehicle when a state in which the travel control for the vehicle is performed has continued during a predetermined period so that the vehicle travels to a position based on the map road marking before the correction.

7. A vehicle control method comprising:

recognizing, by a computer mounted on a vehicle, a road marking located in a travel direction of the vehicle;

determining, by the computer, whether or not the recognized road marking matches a map road marking based on map information stored in a storage unit and determining whether or not a one-sided road marking that has been recognized matches a one-sided map road marking when the road marking has been recognized only for one side;

correcting, by the computer, the one-sided map road marking on the basis of the recognized one-sided road marking when it is determined that the recognized one-sided road marking matches the one-sided map road marking;

performing, by the computer, travel control for the vehicle; and calculating, by the computer, a first self-position of the vehicle based on the one-sided map road marking before the correction on the basis of a travel state of the vehicle, calculating a second self-position of the vehicle based on the one-sided map road marking after the correction or the recognized one-sided road marking, and performing the travel control for the vehicle so that the vehicle travels to a position based on the map road marking before the correction when an error between the first self-position and the second self-position is greater than or equal to a first threshold value.

8. A computer-readable non-transitory storage medium storing a program for causing a computer mounted on a vehicle to:

recognize a road marking located in a travel direction of the vehicle;

determine whether or not the recognized road marking matches a map road marking based on map information stored in a storage unit and determine whether or not a one-sided road marking that has been recognized matches a one-sided map road marking when the road marking has been recognized only for one side;

correct the one-sided map road marking on the basis of the recognized one-sided road marking when it is determined that the recognized one-sided road marking matches the one-sided map road marking;

perform travel control for the vehicle; and calculate a first self-position of the vehicle based on the one-sided map road marking before the correction on the basis of a travel state of the vehicle, calculate a second self-position of the vehicle based on the one-sided map road marking after the correction or the recognized one-sided road marking, and perform the travel control for the vehicle so that the vehicle travels to a position based on the map road marking before the correction when an error between the first self-position and the second self-position is greater than or equal to a first threshold value.

* * * * *